United States Patent [19]
Majestic et al.

[11] Patent Number: 5,458,849
[45] Date of Patent: * Oct. 17, 1995

[54] PREVENTION OF CRACKING AND BLISTERING OF REFINERY STEELS BY CYANIDE SCAVENGING IN PETROLEUM REFINERY PROCESSES

[75] Inventors: Veronica K. Majestic, Stafford, Tex.; Manian Ramesh, Naperville, Ill.

[73] Assignee: Nalco Chemical Company, Naperville, Ill.

[*] Notice: The portion of the term of this patent subsequent to Feb. 7, 2012 has been disclaimed.

[21] Appl. No.: 139,974

[22] Filed: Oct. 22, 1993

Related U.S. Application Data

[60] Continuation of Ser. No. 989,297, Dec. 11, 1992, abandoned, which is a division of Ser. No. 805,755, Dec. 12, 1991, abandoned.

[51] Int. Cl.$^6$ .................................................. C23F 11/14
[52] U.S. Cl. ............................. 422/12; 208/47; 252/390; 252/394; 252/401; 252/405; 422/16
[58] Field of Search ................................... 422/7, 14, 16, 422/12; 252/390, 394, 401, 405; 208/47

[56] References Cited

U.S. PATENT DOCUMENTS

| | | | |
|---|---|---|---|
| 4,009,243 | 2/1977 | Weber et al. | 423/234 |
| 4,595,723 | 6/1986 | Henson et al. | 524/398 |
| 4,900,427 | 2/1990 | Weers et al. | 208/48 |
| 4,978,366 | 12/1990 | Weers | 208/236 |
| 5,074,991 | 12/1991 | Weers | 208/236 |

*Primary Examiner*—Robert J. Warden
*Assistant Examiner*—Robert Carpenter
*Attorney, Agent, or Firm*—Robert A. Miller; James J. Drake

[57] ABSTRACT

Corrosion cracking and blistering of steels in contact with refinery streams containing cyanide is inhibited or prevented by treating said stream with a reaction product or products obtained by reacting morpholine and formaldehyde. The preferred corrosion cracking and blistering inhibiting treatment product is bis–(morpholinyl-)- methane.

6 Claims, 1 Drawing Sheet

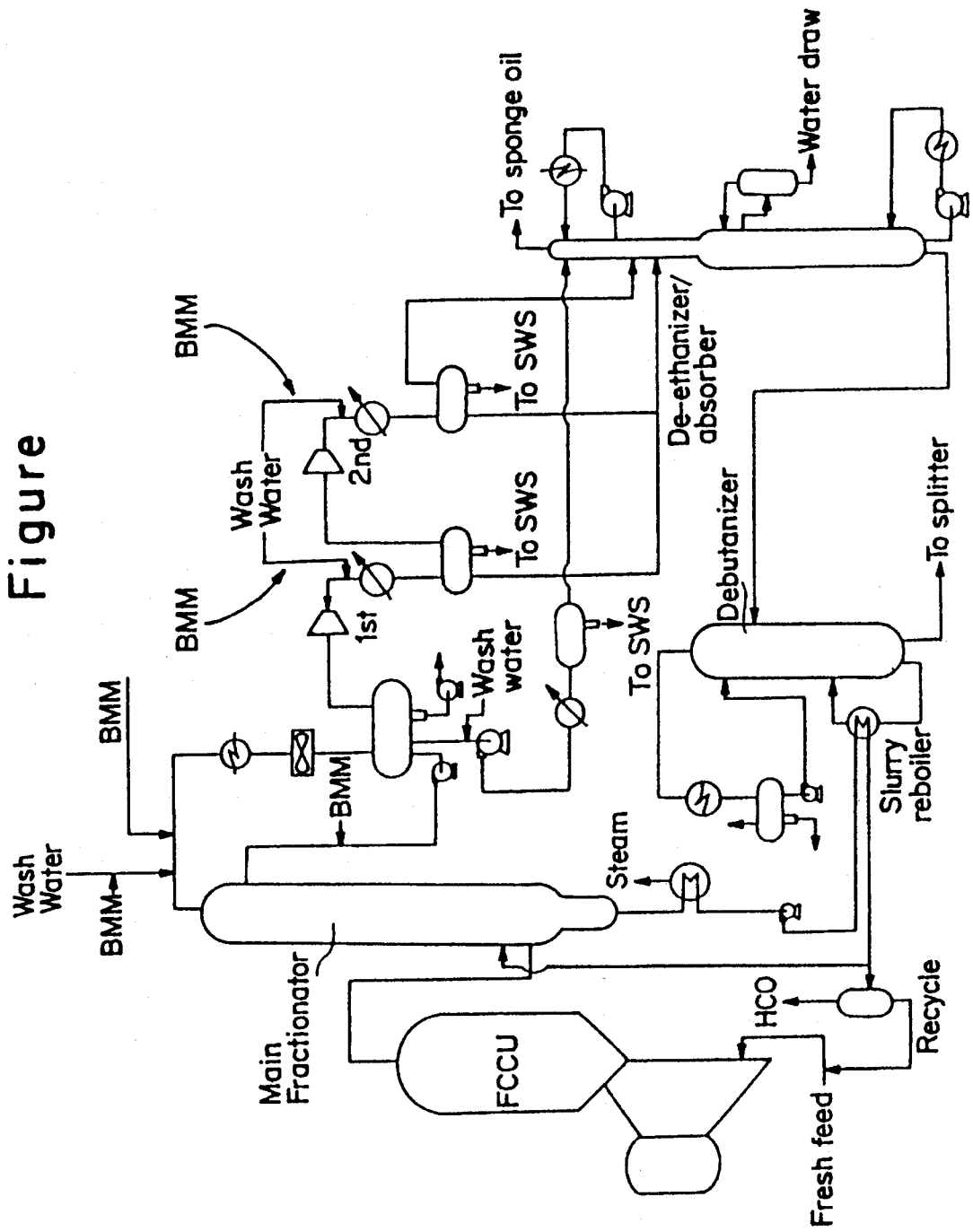
Figure

PREVENTION OF CRACKING AND BLISTERING OF REFINERY STEELS BY CYANIDE SCAVENGING IN PETROLEUM REFINERY PROCESSES

This is a Continuation of application Ser. No. 07/989,297 filed on Dec. 11, 1992, which is a Divisional of application Ser. No. 07/805,755 filed Dec. 12, 1991, both abandoned.

Intergranular cracking and failure of carbon steel piping and vessels occurs in various refinery overhead streams. The metal vessels and piping in contact with these overhead streams are subject to blistering and stress corrosion cracking because they primarily contain, or are in contact with, chemicals such as hydrogen sulfide, ammonia, carbon dioxide, water, hydrogen cyanide, and the like. The presence of these chemicals contributes to corrosion cracking and blistering of iron and steel vessels in contact with these refinery streams, particularly when these refinery streams contain hydrogen sulfide and hydrogen cyanide.

It would, therefore, be an advancement in the art if one could derive a compound which would react both with hydrogen sulfide and particularly with any source of cyanide, be it hydrogen cyanide or salts of cyanide. Even phenomenon referred to as hydrogen blistering or hydrogen induced cracking appears to be in some ways, related to the presence of cyanide. Therefore, the removal of cyanide from refinery streams in contact with these steel refinery vessels and piping should be beneficial in minimizing hydrogen blistering or hydrogen induced cracking.

OBJECTS OF THE INVENTION

It is, therefore, an object of this invention to provide a method of inhibiting stress corrosion cracking and hydrogen blistering in the presence of cyanide by adding to refinery streams certain materials that scavenge cyanide and thereby remove cyanide from these streams while forming innocuous compounds, which compounds do not contribute to cracking, corrosion, or blistering of these iron and steel surfaces in contact with these hydrocarbon refinery streams.

It is another object of this invention to treat the refinery gaseous or liquid streams containing cyanide or sulfide acids, or vapors or water solutions of salts thereof, with corrosion cracking and blistering inhibiting amounts of a cyanide active chemical, which chemical may also be used as an acid neutralizing agent, both before and after cyanide reaction.

It is a further object of this invention to treat these refinery overhead and/or wash water streams with corrosion, cracking, and blistering inhibiting amounts of a chemical containing carbon hydrogen, nitrogen, and oxygen, which chemical is obtained from the reaction of morpholine and formaldehyde.

It is a further object to treat these refinery overhead streams or wash water streams with from a 1:1 to a 2 to 1 mole ratio reaction product of morpholine and formaldehyde. The 1 to 1 mole ratio reaction of products derived by reacting formaldehyde and morpholine give mixtures of products which mixtures are anticipated in this invention.

A BRIEF DESCRIPTION OF THE DRAWING

FIG. 1 describes a fairly routine flow diagram involving a fluid catalytic cracking unit and main fractionator and accompanying equipment, such as a slurry re-boiler, a debutanizer, a de-ethanizer absorber, various condensors, storage vessels, pipelines, pumps, heaters, and the like relating to the operation of this main fractionator. Our cyanide and $H_2S$ scavenging reactants are particularly useful in the water wash streams of these systems.

The drawing is also used to show where formulations containing the adducted materials between morpholine and formaldehyde, particularly the bis-morpholinyl methane containing products, may be added to effectively treat a refinery system and inhibit corrosion, stress cracking, and blistering of steel and iron vessels and pipelines in contact with refinery streams, such as those streams obtained as an overhead stream in the main fractionators. These refinery streams contain ammonia or ammonia salts, hydrogen cyanide or cyanide salts, hydrogen sulfide or sulfide salts, as well as other acid sources, low molecular weight organics, water, and the like. These streams are particularly corrosive and cause blistering and cracking if left untreated.

Although FIG. 1 primarily outlines the accompanying flow diagrams and attachments demonstrating the operation of a main fractionator and its attached units, other refinery operations, such as a fluid catalytic cracking unit (FCCU) and the like may also contain overhead streams having cyanide, sulfide, water, and similar corrosive components and environments.

Our invention is meant also to treat such refinery streams that contain cyanide, that contain cyanide and hydrogen sulfide, and particularly which contain cyanide, either as a free acid or salts thereof with hydrogen sulfide as the pre-acid or salts thereof, in the presence of water to prevent and inhibit corrosion, stress cracking, and blistering of steel and iron surfaces in contact with streams that contain these corrosive materials.

THE INVENTION

We have found a method of inhibiting stress corrosion cracking and hydrogen blistering of carbon steels exposed to refinery gaseous and/or liquid streams containing cyanide, which method comprises adding to said refinery streams an effective corrosion inhibiting amount of a reaction product of morpholine and formaldehyde.

Preferably, the reaction product of morpholine and formaldehyde is that reaction product that contains from about 1:1 to about a 2 to 1 mole ratio of morpholine to formaldehyde. These reaction products contain structures demonstrated in Formula I.

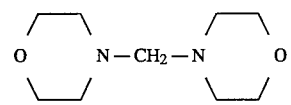

Formula I

The compound represented by Formula I may be referred to as bismorpholinyl methane.

However, when manufacturing the chemical described as the 2 to 1 mole adduct in Formula 1, other reactions, particularly at a 1:1 mole ratio, can occur, such that the materials represented as Formula II and III below may also be formed:

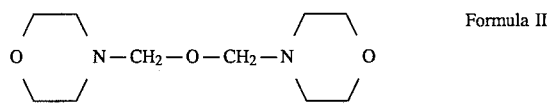

Formula II

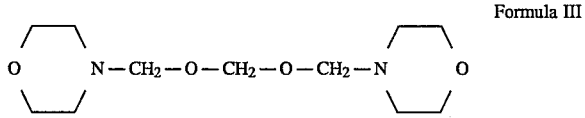

Formula III

The compounds represented by Formula I, II, and/or III, and any admixture thereof is referred to herein as the adducted materials.

Cyanide Scavenging Reactions

Reactions have been demonstrated in the laboratory, which reactions indicate that the reaction products of morpholine and formaldehyde, particularly that reaction product demonstrated in Formula I above, but also the reaction products in Formula II and III above, react nearly quantitatively with cyanide ion. The reaction is demonstrated below:

(Reaction I)

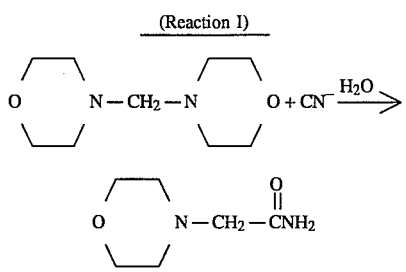

As earlier stated Reaction I is essentially quantitative in terms of its capability of eliminating cyanide ion. Also, note that both the bis-morpholinyl methane and the amide product obtained by reacting with cyanide (after hydrolysis) are both amines capable of neutralizing acids, such as $H_2S$.

The method of our invention is useful in primarily overhead refinery streams and in treating wash water streams, which wash water streams may be any wash water stream dealing with a main fractionator, a debutanizer, a de-ethanizer or absorber or any cracking tower, and such condensors, absorbers, storage vessels, and pipelines related to the operation of a main fractionator or a catalytic cracking tower operating in the refinery.

In treating the refinery overhead and/or wash water aqueous streams, an aqueous solution of the bis-morpholinyl methane or the other reaction products obtained by reacting morpholine and formaldehyde may be added to the refinery system. An aqueous based solution or treating agent containing the bis-morpholinyl methane is preferred, but this solution may contain alcohols such as ethanol and the like. The bis-morpholinyl methane is primarily water soluble, but it also distributes and dissolves in organic solvents such as aromatic hydrocarbons. The materials may be added to the refinery stream as an organic solution, such as in toluene, or even as aqueous or alcoholic solutions or even may be added as emulsions containing organic solvents dispersed in water or a water solvent dispersed in an organic continuous phase.

The treatment formulations, be they aqueous, alcoholic, or aromatic, or mixtures or emulsions thereof, normally contain at least 1.0 weight percent of the bis-morpholinyl methane adduct, but may contain from about 20 to as high as 90 weight percent of this adduct, or its admixtures with formulations II and/or III.

When the adduct material is added and so formulated, it is done so primarily for the ease of addition to the refinery overhead and/or wash water stream being treated, and the effectiveness of the bis-morpholinyl methane adducts and the other adducted materials as in Formulas II and III, or mixtures thereof, or any other reaction products of morpholine and formaldehyde is essentially unaffected for the purpose of $CN^-$ scavenging.

If these adducted materials are being added in an aqueous stream, the aqueous stream should be at a pH of at least 5.0, preferably at a pH of at least 6, or higher.

The adducted reaction product of morpholine and formaldehyde, primarily the bis-morpholinyl methane, is added to the refinery stream, again preferably a water containing refinery stream, which stream contains cyanide either as the free acid or salts thereof, and which cyanide may be in a gaseous or solution form. These refinery streams may contain water, hydrogen cyanide, ammonia, hydrogen sulfide, HCl, and other materials and components normally present in a refinery stream. When these adducted materials are added to a cyanide containing stream, they are preferably added at a concentration which would provide for essentially quantitative or analytical removal of cyanide ion by providing at least a mole for mole presence of the bis-morpholinyl methane relative to the cyanide ion present. However, submolar amounts may be added and will remove at least a portion of the cyanide present, if so done. It is believed that any removal of cyanide ions will cause a decrease in corrosion, cracking, and blistering of steel and iron vessels in contact with refinery streams so treated when these streams contain cyanide.

The refinery stream being treated is preferably a wash water stream and is treated with from 0.5 to about 2500 ppm of the morpholine/HCHO products. Preferably, the refinery stream is treated with from about 1.0 to about 2000 ppm bis-morpholinyl methane, alone or in admixture with adducts represented in Formulations I and II.

It is a benefit that the bis-morpholinyl methane reaction product of morpholine and formaldehyde, as well as, the other adducted reaction products listed above, can also react with hydrogen sulfide. When refinery streams contain both hydrogen sulfide and cyanide, either as the pre-acid or salts thereof, these streams may successfully be treated to inhibit corrosion, cracking, and blistering of steel and iron surfaces in contact with said streams by treating with the bis-morpholinyl methane adducted compounds and/or the other adducted reaction products derived by reacting morpholine with formaldehyde.

Preferably, in the presence of hydrogen sulfide and hydrogen cyanide, or their salts, and in the presence of water, sufficient bis-morpholinyl methane and/or other adducts of morpholine and formaldehyde should be added to react with the hydrogen sulfide and hydrogen cyanide present.

EXAMPLES

To represent these reactions, the following reactions have been accomplished in the laboratory and are demonstrated by example.

By eliminating cyanide, we eliminate one of the catalytic reasons why cracking, corrosion, and blistering of steel surfaces exposed to cyanide occurs. The reactions below show that we have discovered a method of reacting morpholine with formaldehyde to obtain reaction products, which product primarily contains bis-morpholinyl methane, and that the reaction of bis-morpholinyl methane and the other adducts with cyanide is essentially quantitative under conditions which are reproduced in refinery streams, particularly refinery wash water streams.

Example I

One mole of morpholine, 87 grams, was reacted with one mole of formaldehyde, 33 grams, by adding to a 3-neck round bottom flask equipped with a thermometer, a condenser, a stirrer, and a heating unit, the morpholine and cooling the morpholine to about 3° C. After the temperature had been reached, the formaldehyde was added slowly with stirring. After the addition of formaldehyde (as paraformaldehyde) was complete, the reaction contents were allowed to warm to room temperature (approximately 20°–25° C.). This required about 90 minutes. The reaction vessel contents were then heated to 110° C. for two hours and cooled. The reaction products remain miscible with the water formed by the reaction. Analysis indicated the presence of bis-morpholinyl methane.

The reaction product from Example I above was dissolved in a heavy aromatic naphtha obtained commercially. This solution became cloudy upon addition of the heavy aromatic naphtha and water settled to the bottom of the flask. Approximately 30 milliliters of water was removed by separatory funnel volume separation and the hydrocarbon product remaining was dried over calcium sulfate, filtered to remove any insoluble residual, and stored. The heavy aromatic naphtha was removed in vacuo to obtain the product which analyzed as containing bis-morpholinyl methane.

Example II

Bis-morpholinyl methane, contained as a 93 weight percent solution in water, was added to a solution of potassium cyanide. The bis-morpholinyl methane treated KCN solution contained 650 milligrams of bis-morpholinyl methane, approximately 1 equivalent, and contained 1.3 grams of potassium cyanide, again approximately 1 equivalent. This aqueous blend was heated to 90° C. for four hours. The solution was cooled to room temperature and acidified with dilute hydrochloric acid to a pH of 7. This essentially neutral solution was then extracted with methylene chloride and the methylene chloride extract was collected, dried over sodium sulfate, and evaporated on a rotovap to yield a product, which was identified as the morpholino acid amide product of Reaction I above. The yield was quantitative. Morpholino acid amide is essentially soluble in water, but will preferentially partitions into methylene chloride.

The conclusion was that the bis-morpholinyl methane reacts essentially quantitatively with cyanide and is an excellent cyanide ion scavenger.

Example III

A blend of a product containing the reaction adduct materials from formaldehyde and morpholine in water, which product contained from 70–90 weight percent bis-morpholinyl methane, was reacted with potassium cyanide in a water solution containing hydrogen sulfide. The 70–90 weight percent bis-morpholinyl methane (1.5 grams) and potassium cyanide (650 milligrams in water) were added to 50 milliliters of water and heated to 90° C. for a period of 3 hours. The mixture was cooled to room temperature and the pH was again brought to 7 by the addition of hydrochloric acid. This solution was again extracted with methylene chloride and the organic extract was washed with water, dried, and evaporated to give a methylene chloride residue, which was analyzed by nuclear magnetic resonance spectroscopy. The product was a mixture of N-morpholinyl acid amide and bis-morpholinyl dimethyl ether. The bis-morpholinyl dimethyl ether is an anticipated by-product of the reaction between formaldehyde and morpholine, and is represented in Formula II above.

Example IV 7.9 grams of morpholine (0.1 moles) plus 1.5 grams of formaldehyde (about 0.05 moles), as paraformaldehyde, were reacted in a 4 necked flask fitted with a thermocouple, Dean-Stark condenser, a nitrogen inlet, and a stirrer. One hundred milliliters of toluene was added to the flask along with the morpholine. Paraformaldehyde was slowly added, keeping the temperature below 20° C. The reaction mixture was then slowly heated to reflux temperature and kept at reflux temperature approximately 3 hours and then cooled. The reaction mixture was evaporated to dryness using a rotary evaporator. The sample remaining was analyzed and demonstrated to be nearly a quantitative yield of bis-morpholinyl methane.

Example V

The bis-morpholinyl methane obtained in previously (Example IV) was added to an aqueous solution containing 500 parts per million cyanide as potassium cyanide and 500 parts per million sulfide as hydrogen sulfide. To this solution, 1200 parts per million bis-morpholinyl methane was added as an aqueous methanol solution (2.6 ml), said aqueous methanol solution consisted of 10 ml. methanol in 40 ml. water.

The reaction mixture was heated for 2.0 hours at 80° C. (initial temperature 20°, heated to 80° in approximately 30 minutes, and then maintained at 80° for about two hours).

This mixture was cooled to room temperature and analyzed. The analysis indicated that 91+ percent of the cyanide ion had been removed by this process. The conclusion is that the bis-morpholinyl methane is a good cyanide ion scavenger while the morpholine nitrogen is capable of simultaneously neutralizing hydrogen sulfide.

(Reaction II)

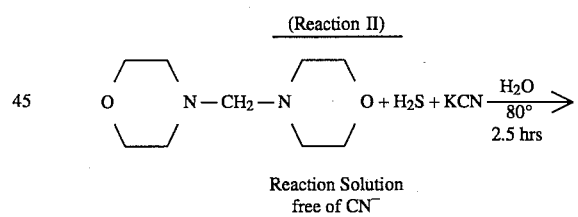

Reaction Solution free of CN⁻

Having described our invention, we claim:

1. A method of preventing corrosion, cracking, and blistering of steel and iron vessels and pipelines in contact with refinery overhead and wash water streams containing cyanide, either as a free acid or salts thereof, which method comprises adding to said streams an effective corrosion, cracking, and blistering inhibiting amount of a reaction product obtained by reacting morpholine with formaldehyde.

2. The method of claim 1, wherein the stream is a wash water stream for at least one of the refinery operations selected from the group consisting of a main fractionator, a cracking tower, or any heat exchangers, condensers, debutanizers, de-ethanizers, absorbers, and storage vessels related to the operation of a main fractionator or cracking tower.

3. A method of inhibiting corrosion cracking and blistering of steels in contact with oil refinery overhead and wash water streams containing cyanide, as a free acid or salts thereof, which method comprises adding to said streams at least 0.5 ppm, based on the stream weight, of a reaction product obtained by reacting morpholine and formaldehyde, in at least molar equivalent ratios.

4. A method of inhibiting corrosion cracking and blistering of steels in contact with refinery overhead and wash water streams containing cyanide, which method comprises adding to said streams from 0.5 ppm to about 2500 ppm of at least one of the inhibiting components:

a) dimorpholinomethane;

b) morpholino-$CH_2$-O-$CH_2$-morpholino:

c) morpholino-$CH_2$-O-$CH_2$-O-$CH_2$-morpholino;

d) or mixtures thereof.

5. The method of claim 4, wherein the stream also contains at least one component selected from the group consisting of $H_2S$, $NH_3$, and HCl.

6. The method of claim 4, wherein the inhibiting compounds are dissolved in at least one solvent selected form the group consisting of water, methanol, ethanol, propanol, isopropanol, and aromatic hydrocarbons, and the refinery stream is a wash water stream for a main fractionator.

* * * * *